No. 683,836. Patented Oct. 1, 1901.
T. C. X. A. BERGET.
PROCESS OF MAKING PAPER PULP.
(Application filed Dec. 5, 1900.)
(No Model.)
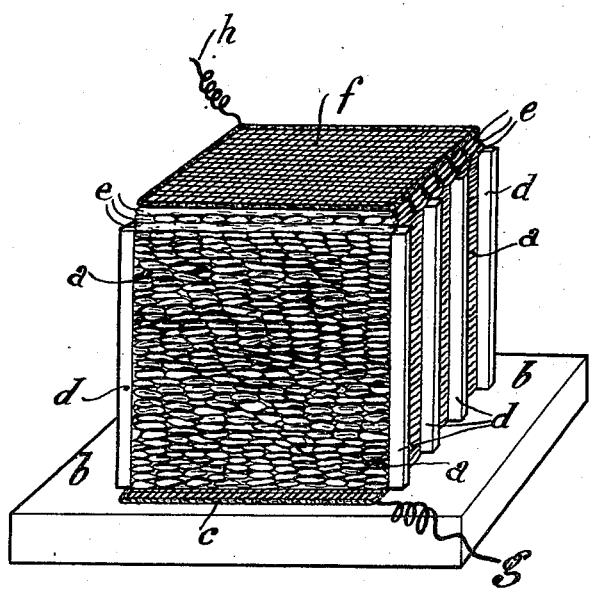
Witnesses:
Inventor:
Thomas C. X. A. Berget
By Munn
Attorneys

UNITED STATES PATENT OFFICE.

THOMAS CLAUDE XAVIER ALPHONSE BERGET, OF PARIS, FRANCE.

PROCESS OF MAKING PAPER-PULP.

SPECIFICATION forming part of Letters Patent No. 683,836, dated October 1, 1901.

Application filed December 5, 1900. Serial No. 38,890. (No specimens.)

*To all whom it may concern:*

Be it known that I, THOMAS CLAUDE XAVIER ALPHONSE BERGET, a citizen of the Republic of France, and a resident of the city of Paris, France, have invented a certain new and useful Improvement in the Process of Making Paper-Pulp, of which improvement the following specification is a full, clear, and exact description.

The essential operations which constitute the manufacture of paper stuff consist, as is well known, in rendering soluble and then eliminating by lixiviation the foreign substances in connection with the cellulose and which surround the latter in the vegetable tissues.

Unlike the paper-pulp obtained by methods heretofore used, the product obtained by the process forming the subject of the present invention is completely fermented during the process itself.

My improved process consists, essentially, in the starting of the fermentation through the combined influence of an electric alternating current and the heat developed by it in its passage through the substance and then finally allowing the fermentation to terminate spontaneously without the further application of the electric current, it being facilitated, if necessary, by the presence of a medium varying according to the nature of the substance under treatment—for example, by impregnating the material, according to the particular use, either with milk of lime, dilute hydrochloric acid, or marine salt.

The accompanying drawing is a perspective view of the apparatus employed in carrying out my process, while the claims define the scope of my invention.

The materials for use as paper-pulp, such as nettle, may be in a green state or in a dry condition, such as straw and wood. My process is applicable to these two classes of materials, the difference in treatment affecting only the medium in the presence of which the fermentation is effected and upon the duration of the latter.

In order that my invention may be readily understood, I will now describe by way of an example the operations necessary for the practical preparation of paper stuff from nettle.

The stems of the nettle, after having taken off the leaves, are first crushed between crushing-rollers, so as to form a coarse or thick paste. The mass thus obtained is placed to disintegrate for several days in a solution of four parts of lime and ninety-six parts of water. Next the crushed stems of the nettle are drained and piled into a stack $a$ upon an impermeable floor $b$, covered with a metallic gauze $c$. The height of the stack $a$ must not exceed one meter at the most; otherwise the weight of the stack would be so great that the upper layers would exert an excessive pressure upon those below. In order to insure the stability of the stack $a$, uprights $d$, fixed in the floor $b$, are employed. The entire upper surface of the stack $a$ is covered with a layer $e$ of oakum impregnated with a solution of lime consisting, as aforesaid, of four parts of lime and ninety-six parts of water. The said layer $e$ of oakum is maintained in permanent contact with a metallic gauze $f$. The metallic gauzes $c$ and $f$ serve as electrodes for an alternating electric current supplied by the conductors $g$ and $h$ with a difference of potential of about forty volts. The intensity of the current which is thus circulated within the stack $a$ varies between five and six amperes for each one hundred kilograms of material treated. Under the influence of this current the mass attains soon a temperature of from 50° to 55° centigrade, which should not be exceeded. Fermentation now quickly starts through the combined action of the current and the heat it develops, thus causing the transformation of the agglutinous substances. The duration of this first treatment is about eight hours for nettles. At the end of this time the current is interrupted, and the mass is allowed to remain untouched for a day or two, the fermentation still continuing on its own accord and finishes in completely transforming the nature of the agglutinous substances. The mass is thereupon subjected to the various treatments usually employed in the manufacture of paper-pulp, such as lixiviation, extraction of fibers, bleaching, and the like.

By the employment of my improved process the various consecutive operations for the transformation of the material employed are effected readily and expeditiously, while the fiber after treatment preserves all its original tenacity and is no longer liable to alter in time, as often happens when subjecting it to violent chemical actions, such as by means of bisulfites and alkalies under steam-pressure.

The materials necessary for carrying the treatment into effect are, as has been explained, of the simplest kind. Particularly when the electric current is produced by the aid of water as the motive power it is possible to carry out the treatment at a highly-reduced expenditure, all the more so as the raw material—lime, for example—is very cheap, while the manual labor is exceedingly simple, and consequently involves little outlay.

I do not limit myself in any way to the precise details of the treatment hereinbefore described, as I may vary said details in many ways without departing from the spirit of my invention.

What I claim, and desire to secure by Letters Patent of the United States, is—

1. A process for the manufacture of paper stuff from vegetable substances, consisting in crushing the said substances, then placing the coarse pulp thus obtained in the path of an electric alternating current of sufficient electromotive force and intensity to produce, by the combined action of this current and the heat it develops during its passage, a rapid fermentation of the agglutinous substances of the fibers and which is afterward completed by allowing the mass to remain untouched, substantially as hereinbefore described and for the purpose specified.

2. A process for the manufacture of paper stuff by the aid of appropriate vegetable substances, consisting in crushing the said substances, of impregnating the mass of coarse pulp thus obtained with a chemical agent such as lime-milk, dilute hydrochloric acid, marine salt or other appropriate matter capable of facilitating the subsequent fermentation, then subjecting the mass thus prepared to the action of an electric alternating current to produce by means of the said current and the heat it develops during its passage in connection with the chemical impregnating agent a rapid fermentation of the agglutinous substances of the fiber, such fermentation being completed afterward by allowing the mass to remain untouched, substantially as and for the purpose hereinbefore described.

3. The herein-described process of fermenting disintegrated paper-stock, which process consists in impregnating the said stock with a solution serving to facilitate fermentation; subjecting the impregnated stock to the heating action of an alternating electric current for a suitable period; and allowing the fermentation thus begun to continue.

4. The herein-described process of starting fermentation in paper-stock, which process consists in subjecting the said stock to an initial heating by means of an alternating electric current.

5. The herein-described process of making paper-pulp which consists first in crushing vegetable material; disintegrating the crushed material; impregnating the disintegrating material with a suitable chemical solution for the purpose of facilitating fermentation; starting fermentation in the material by the action of an alternating electric current; and allowing the fermentation thus begun to continue spontaneously.

6. In the herein-described process of making paper-pulp, the method of subjecting disintegrated and chemically-impregnated paper-stock to the action of an alternating electric current.

7. The herein-described process of making paper-pulp, which process consists in spreading suitably-prepared paper-stock between electrodes and subjecting the said stock to the action of an alternating electric current for the surpose of producing fermentation.

8. In the manufacture of paper-pulp, the method of subjecting vegetable material to molecular disturbance and heat by passing an alternating current through the vegetable material.

In testimony whereof I have hereunto signed my name in presence of two subscribing witnesses.

THOMAS CLAUDE XAVIER ALPHONSE BERGET.

Witnesses:
GEORGES DELOW,
EDWARD P. MACLEAN.